United States Patent [19]

O'Gwynn

[11] Patent Number: 4,768,102
[45] Date of Patent: Aug. 30, 1988

[54] METHOD AND APPARATUS FOR SYNCHRONIZING A CONTROLLER TO A VTR FOR EDITING PURPOSES

[75] Inventor: David C. O'Gwynn, Colorado Springs, Colo.

[73] Assignee: Ampex Corporation, Redwood City, Calif.

[21] Appl. No.: 924,074

[22] Filed: Oct. 28, 1986

[51] Int. Cl.$^4$ .......................... H04N 9/87; H04N 9/64
[52] U.S. Cl. ..................................... 358/311; 358/324; 358/17
[58] Field of Search ............... 358/310, 311, 312, 313, 358/324, 325, 326, 329, 320, 11, 12, 17; 360/33.1

[56] References Cited

U.S. PATENT DOCUMENTS

| | | | |
|---|---|---|---|
| 3,878,557 | 4/1975 | Vidovic | 358/326 |
| 4,007,486 | 2/1977 | Inaba et al. | 358/324 |
| 4,215,362 | 7/1980 | Ravizza | 358/329 |
| 4,376,954 | 3/1983 | Ross | 358/312 |

OTHER PUBLICATIONS

Ampex Corp., VRC-2 VTR Remote Controller, Installation and Operation Manual, Catalog No. 1809669, Aug., 1985.

Primary Examiner—Donald McElheny, Jr.
Attorney, Agent, or Firm—George B. Almeida; Richard P. Lange

[57] ABSTRACT

A VTR controller provides an internal counter which counts a frame reference to provide a number representing the position of the reference in the video color sequence. This numbr must be synchronized to the color sequence of the station reference in order to be useful. To synchronize the internal counter in an automated system, the controller places the VTR into color framed playback mode and, after a sufficient period of time, the position of the current time code value in the color sequence is computed. The position is the value that the internal counter should have at that instant in time. The value is loaded into the counter and its output is the color frame sequence number. In a manual embodiment, an operator makes a test edit with the VTR color framer off, to determine if the value in the internal counter is correct and, if not, corrects the value. Prior to the actual edit process, another computation is performed to determine the start of the time lines which control the edit process.

23 Claims, 5 Drawing Sheets

FIG_1

FIG_2

FIG_6

FIG_3

FIG_4

FIG_6

FIG_7

FIG_8

METHOD AND APPARATUS FOR SYNCHRONIZING A CONTROLLER TO A VTR FOR EDITING PURPOSES

BACKGROUND AND SUMMARY OF THE INVENTION

The invention relates to video controllers and in particular to a method and apparatus for controlling a video tape recorder by way of a low cost controller during an editing process, wherein the controller determines the color sequence to provide frame accuracy.

For purposes of description, the present invention is described herein with relation to an editing environment utilizing videotape recorder (VTR) apparatus, which apparatus may include a source VTR from which pre-recorded (source) video signals are reproduced and a record VTR onto which the source video signals are recorded. The source video signals also may be supplied from a video camera, magnetic disk apparatus, or other video signal source.

By way of background, as known to those skilled in the art, when video signals are recorded on magnetic tape, time code addresses also are recorded in a longitudinal track on the tape. Such time code addresses serve to identify the respective frames of video signals such that, during an edit operation, any desired frame can be addressed, whereby the addressed frame may be reproduced from the source tape, or the addressed frame may be erased such as by "over-recording" on the record tape. As further known in the art, one type of time code address used to identify frames is the SMPTE (Society of Motion Picture and Television Engineers) code, which represents frame addresses in terms of hours, minutes, seconds and frames. In addition to recording a time code address, control pulses known as control track signals, also generally are recorded in predetermined relation to the start of a field or frame of video signals. Such control track signals may be counted and used as frame addresses, although it is preferred to utilize the specific time code addresses for this purpose.

By way of further background, the field of color television employs television color standards, two of which are commonly known as NTSC and PAL and are of concern in the description herein. Briefly, in both systems, a chrominance subcarrier signal is used to carry the color information, which subcarrier is multiplexed with a luminance signal which carries the brightness information and the combined signals then are used to modulate the main picture carrier signal in a standard broadcast channel. In the NTSC system the frequency of the chrominance subcarrier is a multiple of one-half the television horizontal line rate which, in turn, causes the phase of the unmodulated subcarrier to alternate between 0° and 180° at the beginning of each line. Thus it takes two lines before the numerical pattern repeats. It follows that in frame-1 the odd and even numbered lines corresponding to the first and second fields, have a chrominance phase of 0° and 180°, respectively. In frame-2 with the third and fourth fields, the opposite occurs. Therefore in an NTSC system, it takes two frames, or four fields, before the color sequence repeats, which gives rise to the term "four field color sequence".

In the PAL system, neglecting a 25 Hertz offset which is inherent in the system, the frequency of the chrominance subcarrier is a multiple of one-fourth the line rate, the phase of the subcarrier is 90° from line to line, and therefore it takes four lines before the numerical pattern repeats. Since there are 625 lines per frame, it takes four frames, or eight fields for the color sequence to repeat in the PAL system, resulting in the term "eight field color sequence".

In addition, there are available at present, video tape recorders such as manufactured by Ampex Corporation, Redwood City, Calif., which have an internal event triggering clocking scheme commonly termed a "time line". This clocking scheme has a number of independent user-settable triggers built in, which may be used to facilitate the remote control of various modes of VTR operation. When an editing device, such as a VTR controller, is used to perform an edit process, several of these event triggers are preset to enable the corresponding event at specific times with specific instructions for each trigger. In an editing process using, for example, the source VTR and the record VTR of previous mention, the time line of each VTR is programmed and the editing device needs only to enable the start of the time lines to perform the edit. Since each VTR will synchronize to its own time line, all the time lines must be started at the same time for the edit to occur at the proper edit point. For VTR's which don't provide a time line, the controller commonly provides a time line and its associated function of controlling the VTR during an edit process.

However, the operation known in the art as color framing complicates the above procedure considerably when performing an edit. To illustrate, it is necessary for the record VTR to be color framed at the edit point to maintain the correct four field, or eight field, color sequence of previous mention, between the source material and the original material previously recorded on the tape. There are two approaches to achieve color framing in editing when using VTR's with time line capability, or when the VTR controller provides the time line. The first is to start the time lines at the appropriate point in the color sequence to insure that at the edit point both the source and record VTR's will be rolling in phase with the reference signal. In this case, the VTR's do not have to do anything but synchronize to their respective time lines.

The second approach involves starting the time lines at an arbitrary point. In this approach, less sophisticated, low cost VTR controllers require that the record VTR color frame itself. This technique requires less complexity in the controlling device but produces some uncertainty in the edit. For instance, if the controller starts the time lines in a source and a record VTR at exactly the correct time in the color sequence for the record recorder to be color framed when it reaches the sync point, the edit will be exactly as requested. On the other hand, if the controller starts either the source or the record time line at some other point in the color sequence, the correct source of material will be put in the wrong place on the record tape. This is because the record VTR edits at the particular time on the time line without regard to the location on tape, but the VTR's color framer will change the tape position relative to the time line as directed by the color frame process, not by the time line. Thus not only will there be errors in the position of the edit point, but the errors in addition may be inconsistent.

A low cost controller can be made consistent by forcing it to always start the time lines at the same point in the color sequence. If this is all that is done, however, only edits for some time code numbers will be color framed. That is, alternate time code numbers would be correct in NTSC due to the two frame color sequence, and every fourth time code number would be correct in PAL due to the four frame color sequence. To correct this situation, a further improvement is made by calculating the starting point of the time lines based on the desired edit point. Then edits for all time code numbers will be color framed since, through calculation, the time lines are started at a particular point, that is, a particular frame, in the respective color sequence.

To this end, there presently are available various VTR controllers of varying complexity which control VTR edit processes, among other control functions. Typical of the less sophisticated of the controllers are those which have an edit accuracy of, for example, ±1 color frame for the record VTR. However, it has been found that the lack of frame accuracy is unacceptable in the industry, even in the less sophisticated, low cost controllers, particularly in the PAL television standard systems where the eight field color sequence may cause errors of ±2 color frames. Furthermore, as previously mentioned, it has been found that the accuracy of such controllers from edit to edit, or preview to edit, is not consistent.

In a sophisticated VTR controller, color frame detector circuits are used to generate a frame identifying reference pulse provided during field-1 of the color sequence, whereby the errors and inconsistency problems are circumvented. However, a color frame detector circuit is relatively complex, and further is different for each television standard, requiring accordingly a different detector circuit for each standard. In addition, the detector circuits require adjustments to be made in the factory, which further would unduly complicate a low cost VTR controller and thus is an undesirable complication.

The present invention overcomes the complications and disadvantages of previous mention, while allowing a relatively low cost remote VTR controller, which does not have color frame detector circuits, to control VTR's with frame accuracy as, for example, during an editing process. In accordance with the invention, the frame reference signal is used to clock an internal frame counter within the controller. The value of this counter is processed to provide a "color frame" number. By way of example, in the NTSC standard, this frame number has two values, 0 and 1 corresponding to the two frames of the four field color sequence, while in the PAL standard, the frame number has four values, 0, 1, 2 and 3 corresponding to the four frames of the eight field color sequence. For editing purposes this color frame number is treated as if it specifies the frame of the color sequence and is used in subsequent edit processes. In generally conventional fashion, during the edits the color framer of the record VTR is turned off.

The logic which clocks the internal frame counter does make the controller consistent, but it may be consistently wrong. There is still no way for the low cost VTR controller to know which frame of the color sequence is actually occurring at any given time. For this reason, in a manual embodiment of the invention, a setup mode is provided which allows the operator to modify the processing of the value of the internal frame counter to change the "phase" of the color frame number. Now, depending upon how the counter and its processing are set up, the edit will always be color framed or will always not be color framed, but will always be in the right place on tape and will always be consistent. The operator then may make a test edit to determine visually if there is a shift in the picture at the edit point and, if so, he may change the "phase" of the internal color frame number to properly color frame the edit, that is, synchronize the controller. In the NTSC standard, this has the same effect as switching the color frame on the VTR from "normal" to "invert". The system in the PAL standard is somewhat more complex because of the four frame PAL color sequence wherein, if correction is necessary, at least one and possibly two shifts may be required as further described below. This use of the setup mode makes the controller consistent and allows the operator to establish rules for a given set of conditions. If conditions change, it is necessary for the operator to again make a test edit (or preview) to determine if the color sequence is correct. Otherwise, the controller remains synchronized for all subsequent edit operations.

In an automated embodiment of the invention, the controller is provided with automatic means, rather than the manual means of previous mention, for processing the color frame number in the counter, and thus for synchronizing the internal clock to the color sequence of the reference. In order for this feature to function correctly several conditions should be met. The controller and the record VTR should have the same reference, and this reference should remain uninterrupted until all edits are complete. In addition, the record VTR should have time code which is correctly color framed, and the time code should be unbroken in the time area where learning during the setup process is being accomplished.

In the automatic system, a setup process causes the selected VTR to go into color framed play for ten seconds of time code. At the end of that time, in accordance with the recorder specifications, the playback from the VTR should be synchronized to its color video reference signal. The time code signal is monitored and the position in the color sequence of the current time code value is computed. This computation is based on the standards information in ANSI standard V98.12M or EBU Tech 3097-E. Once the current position is computed, the internal frame counter of previous mention is reset to this value, and a constant that is used for the processing of the internal frame counter is set to zero, as further described below. After all computations are completed, the VTR is returned to stop mode in readiness for any subsequent editing processes.

In addition, prior to any subsequent edit process, the controller, which is supplied with the current preroll setting and the desired edit entry point, performs another computation to determine on what frame the time line, or lines, should start. When the operator starts the edit (or preview) the time lines are programmed, whereby when the computed frame comes along as indicated by the processed frame counter value, messages are sent to start the time line or lines and the actual edit process is performed.

The frame reference signal is continuously monitored to detect when the reference may be interrupted since, in the absence of the reference, the internal count is no longer synchronized to the color video reference signal and a proper edit may not be made. Means are provided to warn the operator and to prevent further editing until the reference is recovered and the controller again is synchronized.

DESCRIPTION OF THE PREFERRED EMBODIMENTS

Figure 1:
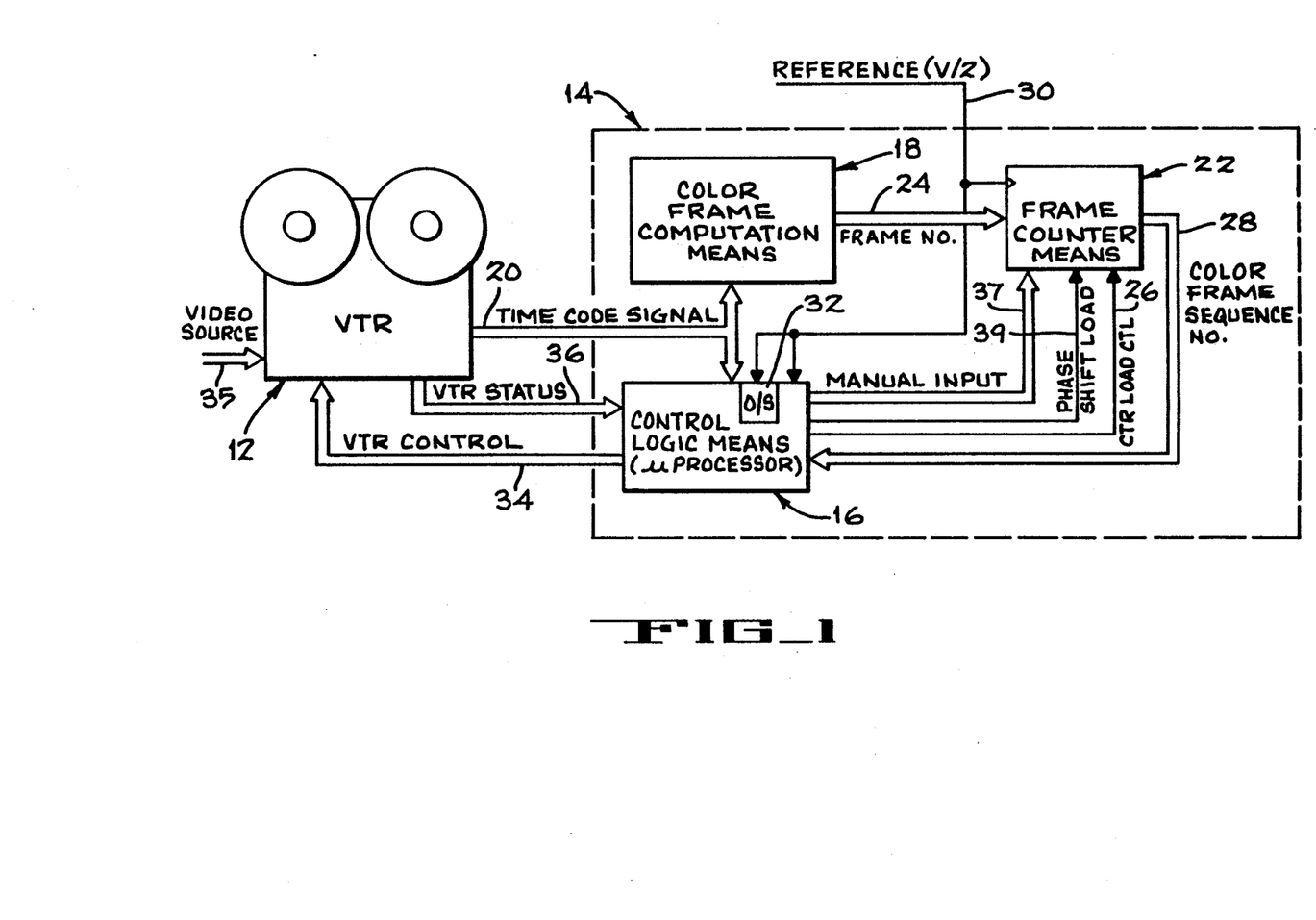
FIG. 1 is a block diagram of the invention in a television editing environment.

FIG. 1 depicts an implementation of the invention in combination with a video tape recorder (VTR) 12, wherein the invention is depicted within a dashed box 14 which, in effect, corresponds to pertinent components within a low cost VTR controller. Such a VTR controller may be the VRC-2 VTR Remote Controller described in Ampex Manual 1809669, August, 1985 and manufactured by Ampex Corporation, Redwood City, Calif. The components of the controller 14 are depicted herein in a hardware environment for purposes of description, and the invention contemplates implementation in the form of discrete circuitry. However, as further described, the invention also readily is practiced via the corresponding software such as illustrated in the routines further described in FIGS. 6–8. The controller 14 includes herein control logic means 16 such as, for example, the control logic contained within the microprocessor circuitry of the VRC-2 Remote Controller of previous mention. A color frame computation means 18 also is included within the controller 14 and can be found, for example, in the microprocessor circuitry. The control logic means 16 and the color frame computation means 18 receive a time code signal, herein from the VTR 12, via a bus 20, and the latter means 18 thence is coupled to frame counter means 22 via a bus 24. The time code signal may be supplied by a video camera or other video source. By way of example, the frame counter means 22 comprises a divide-by-two counter in a NTSC television standard system, and a divide-by-four counter in a PAL system. The control logic means 16 supplies a counter load control signal to the frame counter means 22 via a logic state on a line 26, and the frame counter in turn supplies a color frame sequence number back to the control logic means 16 via a bus 28 during the editing process. A frame reference signal which identifies the second field of every television frame in the color video reference signal, and which may be, for example, the station reference sync V/2 signal, is supplied via a line 30 to the frame counter means 22 to clock the latter. The reference signal also is supplied to the control logic means 16 as well as to a retriggerable one-shot multivibrator 32 herein depicted within the control logic means 16. The one-shot multivibrator 32 is used along with associated software to detect the absence of the reference signal, as further described below. The control logic means 16 provides a VTR control signal to the VTR 12 via a bus 34 which controls operation thereof as during an edit process, and the VTR 12 in turn supplies a VTR status signal back to the control logic means 16 via a bus 36 to indicate the mode of operation. During an edit process wherein the VTR 12 is the record VTR, the source video is supplied from another VTR, a video camera, etc., via a video source bus depicted herein at 35. The control logic means 16 also supplies a manual input and a phase shift load command to the frame counter means 22 via a bus 37 and a line 39, respectively, which inputs are employed in the manual embodiment of the invention and are further depicted and described in FIG. 5 below.

Briefly, regarding the functions of the various components depicted in FIG. 1, the color frame computation means 18 receives the time code signal from the VTR 12 and supplies a digital frame number on bus 24 which identifies the particular selected frame relative to the color sequence from the time code signal. Thus, in a NTSC television standard system, the calculation by means 18 generates a number on bus 24 which identifies the frames of the NTSC television signal; for example, supplies a 0 or 1 corresponding to the first or second frame, respectively of the NTSC color sequence. It follows that the number on bus 24 is an odd or even value which is provided by the least significant bit of the frame count via the time code signal on the bus 20. Thus the equation of the calculation performed in means 18 in an NTSC system is a "frames, modulus 2" operation. The resulting number generated by the means 18 is loaded into the frame counter means 22, whereby the counter now is set with the number which is known to correspond with the color sequence of the reference signal on line 30. Thus now the VTR 12 is color framed and synchronized with station reference, and editing, for example, may be performed between a source VTR, camera, etc., (not shown) and the VTR 12.

Figures 2, 3, 6:
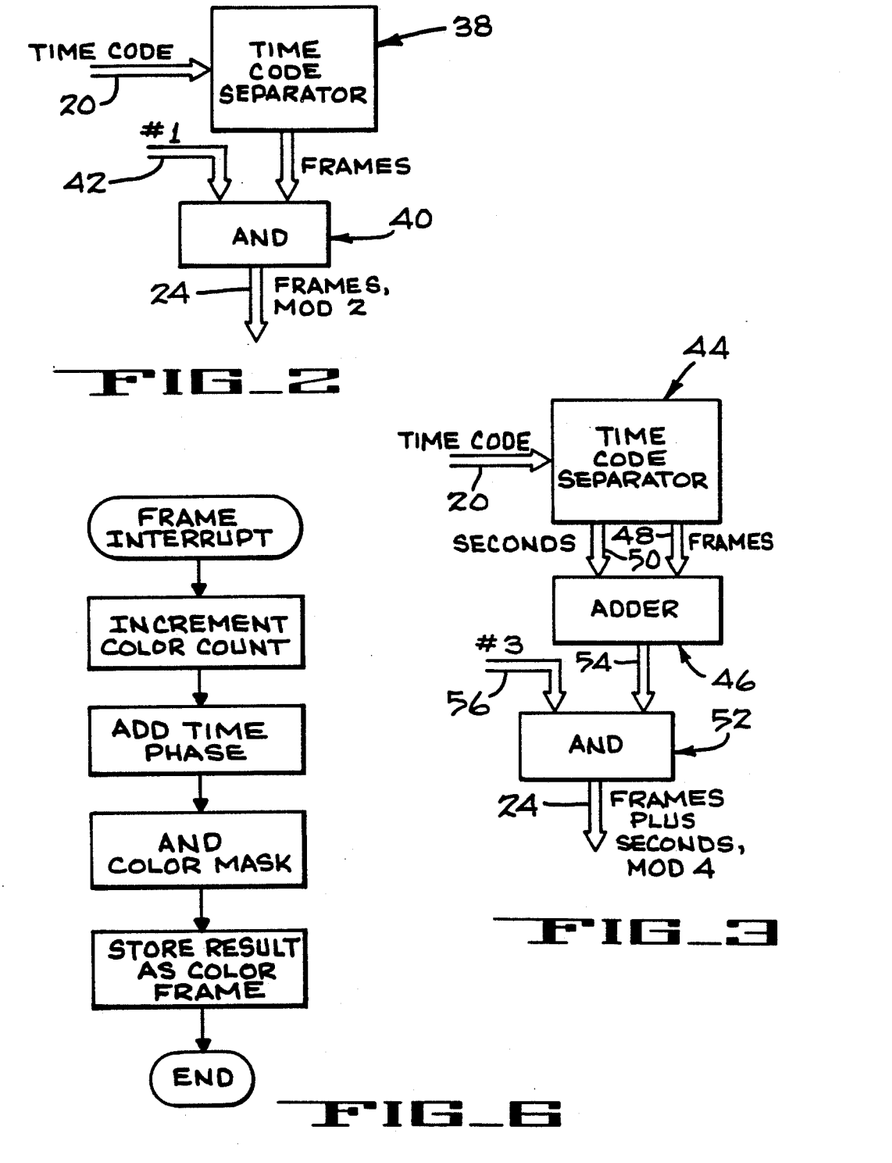
FIGS. 2 and 3 are block diagrams of circuits exemplifying the calculations of the color frame numbers in NTSC and PAL television standards systems, respectively.
FIGS. 6, 7 and 8 are flow charts depicting the "frame interrupt", the "synchronize" and the "reference missing" routines respectively of the invention.

The computations for the NTSC standard are further depicted in a hardware implementation in FIG. 2, by way of explanation. The time code signal on the bus 20 is supplied to a time code separator 38 which, in turn, supplies a digital number corresponding to the current frame to an AND means 40. The time code separator may be a shift register, etc., which receives the time code value of, for example, 80 bits, and extracts the portion thereof which represents the frames, or seconds, as established by ANSI or EBU technical standards. The AND means 40 also is provided with the binary number 1 via a bus 42, which is AND'd with the frame number to provide the operation corresponding to the equation "frames, modulus 2" as the output on the bus 24. Thus, in NTSC, the calculation consists of dividing the frame number by two and taking the remainder.

In a PAL television standard system, there is a four frame color sequence and accordingly the color frame computation in means 18 is defined by the equation "frames-plus-seconds, modulus 4". That is, in the PAL standard the odd/even sequence of the NTSC standard is not maintained and accordingly the computation includes not only the frames information, but also the seconds information, provided by the time code signal. As further depicted in FIG. 3, the time code signal on bus 20 is supplied to a time code separator 44 such as the separator 38 of FIG. 2. Separator 44, in turn, supplies both a frames number and a seconds number to an adder means 46, via buses 48 and 50 respectively. The summation performed by the adder means 46 is supplied to an AND means 52, similar to AND means 40 in FIG. 2, via a bus 54. The AND means 52 further is supplied with a binary number 3 via a bus 56. The signals on buses 54, 56 are AND'd to provide an output corresponding to the equation of previous mention, ergo, "frames plus seconds, modulus 4". The latter conforms in effect to a summation of the frames and seconds numbers, dividing by four and taking the remainder as the output on bus 24.

Figure 4:
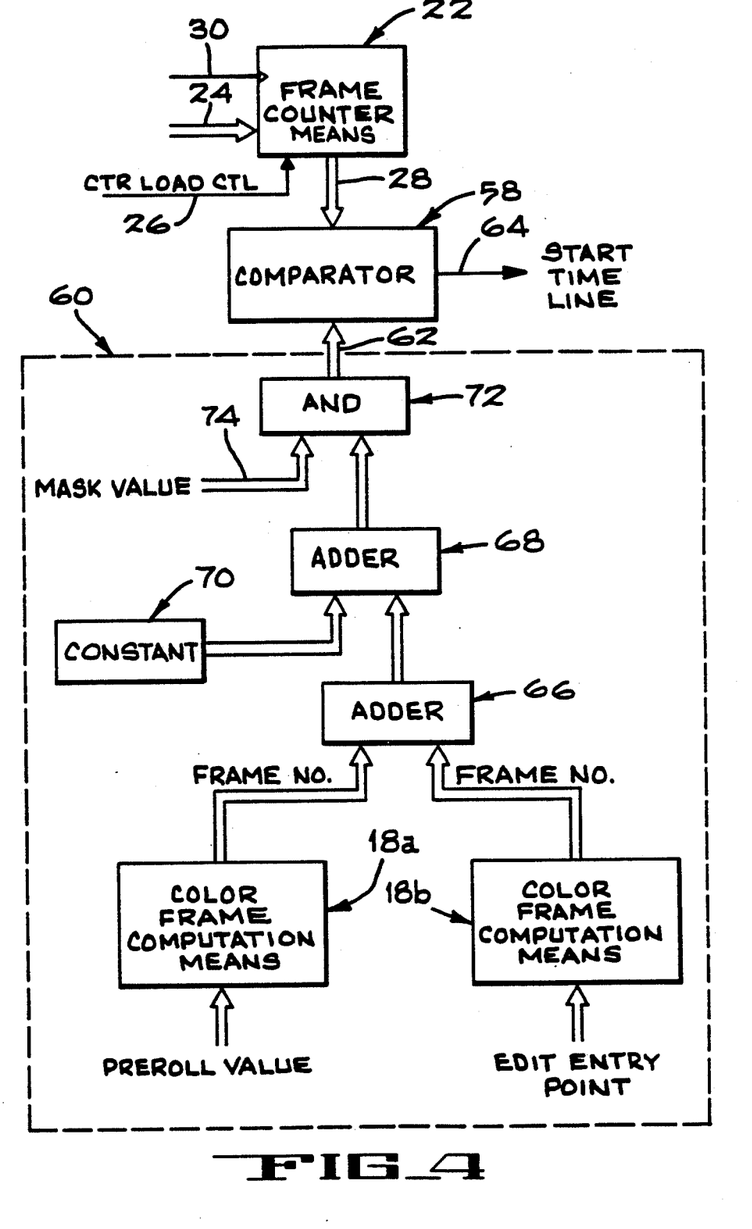
FIG. 4 is a block diagram exemplifying the determination of the start of the time line when performing an edit.

As previously discussed above, once the frame counter means 22 in controller 14 is reset, that is, the controller 14 is synchronized to the color video reference signal in accordance with the invention, and prior to an actual edit, the controller does another computation to determine on what frame the time line of previous mention in each respective VTR should start, in order to provide the edit on the proper frame. Thus, the frame counter means 22 is used not only in synchronizing the controller 14 but also in determining when to start the time line in a subsequent edit process. To this end, FIG. 4 depicts the color frame sequence number on bus 28 coupled from the frame counter means 22 to a comparator means 58. In addition, a calculation means 60 for determining a number corresponding to the start of the time line, is coupled to the comparator means 58 via a bus 62. The comparator means 58 and the calculation means 60 are, in practice, functions performed within the control logic means 16 of the controller 14, but could be implemented as discrete components as further depicted in FIG. 4 and described below. The comparator means 58 compares the fixed digital number from the calculation means 60, with the digital number from the frame counter means 22 which changes every television frame, and generates a logic state on a line 64 when the numbers are equal. The command on the line 64 is used by the control logic means 16 to enable the start of the time line on the proper frame in the respective VTR via the VTR control bus 34 (FIG. 1).

As mentioned above, the time line start calculation is performed after the controller 14 is synchronized and prior to the edit, utilizing respective digital numbers representative of a preselected edit entry point and a preselected preroll value and a computation function corresponding to that performed by the color frame computation means 18. More particularly, as depicted in FIG. 4, the preroll value and the edit entry point are fixed values which are stored as digital numbers in the controller 14 and are entered into respective color frame computation means 18a, 18b which are similar to the computation means 18 but whose functions are actually performed in the control logic means 16, FIG. 1. The values are supplied via, for example, a key pad on the controller front panel (not shown). The means 18a, 18b supply respective frame numbers to an adder means 66 which represents the preselected preroll value and the edit entry point, respectively. The frame numbers are added together and are fed to an adder means 68. A constant, which is system dependent and which compensates for system delays, etc., is supplied as depicted at 70 and is added by adder means 68 to the frame numbers summation. The adder means 68 thence is coupled to an AND means 72, which also receives a mask value corresponding to a modulus operator on a bus 74, which value is a binary 1 in the NTSC, or a binary 3 in the PAL, television standard. The AND means 72 thus performs a modulus 2 or modulus 4 operation depending upon the standard, and the resulting start time line number is the value that should be in the frame counter means 22, that is, is the start number which matches the value in the frame counter means 22 when the time line is enabled upon initiating an edit process.

Although the time line function has been described herein with respect to a time line supplied by the VTR, there are occasions wherein editing is performed with VTR's which do not supply an internal time line. As previously mentioned, in such situations, the controller 14 supplies a time line which performs the same function as the time line in VTR's which have such a feature. As previously mentioned in FIG. 4, in this situation the start time line command on line 64 is used by the control logic means 16 to start the time line within the controller, and to enable the edit process via the VTR control bus 34 to the VTR 12, FIG. 1.

In practice, the frame counter means 22 includes three parts, or functions, and as mentioned above is used during the setup process, as well as to determine at what time to start a VTR time line when performing a test edit (as in the manual embodiment of the invention) or an actual edit. These separate parts may be manipulated separately, but eventually are put together to form the counter value.

To this end, if the frame counter means 22 value is called "color frame", the expression that gives this value is color frame=("color count"+"time phase") AND "color mask". The term "color count" is represented as an 8 bit byte corresponding to the value in a counter (FIG. 5) of the frame counter means 22 that is incremented every television frame. This is the value that is changed in the automatic setup operation, and left unchanged in the manual setup operation. It normally is allowed to increment all the way to binary 255 and then roll over to 0. This is permitted because 255 modulus 4 is equal to 3. The term "time phase" is an 8 bit value which determines how much shift is to be applied to the color count. After an automatic setup operation, this value is set to zero as further described in FIG. 5. It is modified when the operator makes a manual change to the edit "phase" as in the manual embodiment of description herein. The term "color mask" is an 8 bit mask value that is used to perform the masking operation to convert the sum of the other two parts into a small number, that is, it conforms to a modulus operation. In NTSC, color mask has the value 1 commensurate with a modulus 2 operator. In PAL, color mask has the value 3 commensurate with a modulus 4 operator.

Figure 5:
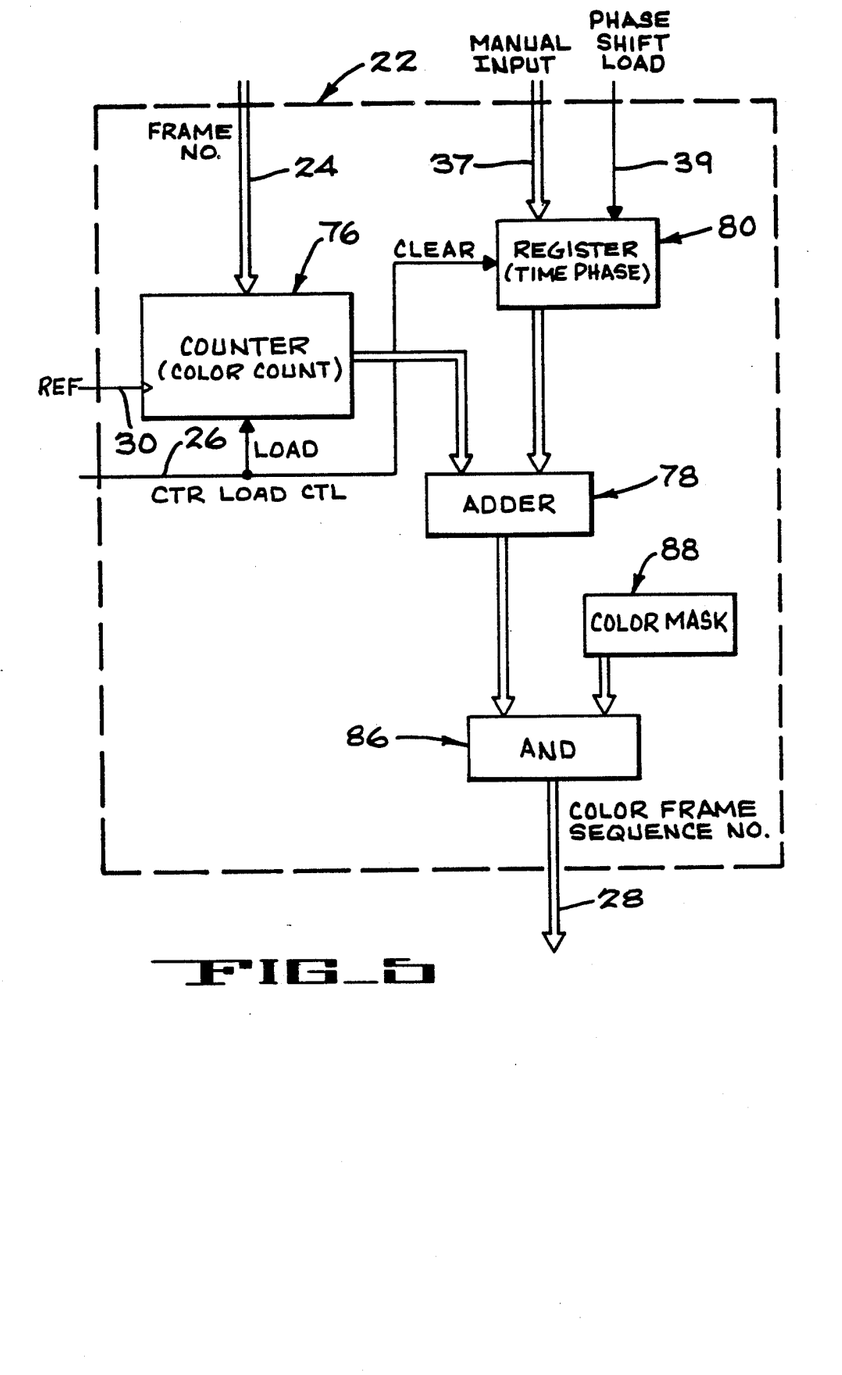
FIG. 5 is a block diagram of the frame counter means 22 of FIGS. 1 and 4.

To illustrate further, FIG. 5 depicts the frame counter means 22 as employed in the automated and manual embodiments of the invention to provide the "color frame" value of previous mention. The frame counter means 22 includes a counter 76 disposed to receive the frame number on the bus 24, the reference signal on line 30 and the counter load control signal on the line 26. Counter 76 supplies the "color count" value of previous mention to an adder 78. A register 80 receives the manual input of previous mention in the form of a binary number supplied on the bus 37 via, for example, a key pad (not shown) or associated software, in the control logic means 16, and also receives the phase shift load command via the line 39, as shown in FIG. 1. The binary number is the "time phase" value of previous invention which determines how much shift is applied to the color count value in counter 76. In the manual embodiment, the manual input is 0 or 1 in NTSC, while in PAL the input is 0, 1, 2, or 3, and the phase shift load command on line 39 is used in the manual embodiment to load the manual input number on bus 37 into the register 80. In the automated embodiment, the counter load control signal on line 26 clears the register 80 to reset it to zero because the counter 76 is loaded with a value which does not need to be shifted. Accordingly, the register 80 and the adder 78 are not required in the automated embodiment since there is no need for a time phase shift, and the counter 76 continuously counts the frames and supplies the resulting numbers via an AND circuit 86.

The adder 78 sums the outputs of the counter 76 and the register 80 and supplies the summation value to the AND circuit 86. The latter circuit 86 also receives a fixed binary number as indicated at 88, corresponding to the "color mask" values 1 or 3 of previous mention which define the modulus 2 operator in NTSC and the modulus 4 operator in PAL, respectively. The value supplied by the AND circuit 86 on the bus 28, is the processed color frame sequence number previously discussed in FIGS. 1 and 4.

Referring now to FIG. 6, the frame interrupt routine illustrates the program for maintaining the frame counter means 22 of FIGS. 1, 4 and 5. A frame interrupt signal comprising herein the reference signal on line 30, is supplied to the control logic means 16 once every frame of video. Upon receiving the interrupt, the color count in the frame counter means 22 is incremented. The routine then adds the time phase to determine how much shift is to be applied to the color count. The summation then is AND'd with the color mask value of binary 1 in NTSC, and binary 3 in PAL. The resulting value is stored for subsequent comparison by the comparator 58 (FIG. 4) during the edit process as previously described.

Figure 7:
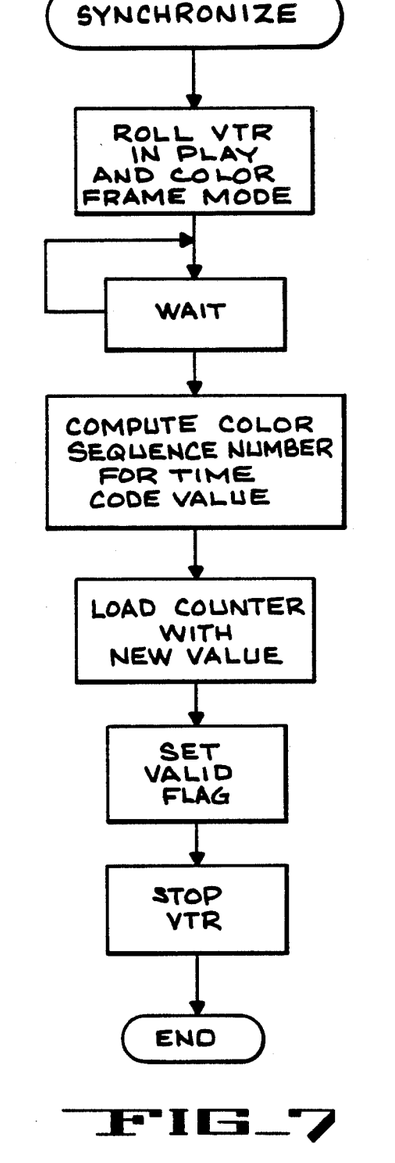

In FIG. 7, the synchronize routine depicts the control of the functions exemplified by the components of FIG. 1 in an automated embodiment. To this end, the VTR 12 first is rolled in the color frame play mode by a command on the bus 34. The system then waits, for example, ten seconds of time code, to allow the VTR 12 to color frame and lock to sync. Next the routine computes the color sequence number for the current time code value, employing the NTSC or PAL equations previously discussed relative to FIGS. 2 and 3 respectively. The calculated number then is loaded into the frame counter means 22 via the counter load control signal on the line 26, to force the number in the counter means to correspond with the current position of the reference in the color sequence. The routine then sets a flag to indicate the counter number is valid, which flag is utilized in the routine of FIG. 8 and in other programs in the system. The VTR 12 then is commanded to stop and the routine is done. Frame counter means 22 now is synchronized and the controller 14 is ready to perform, for example, an editing process.

Figure 8:
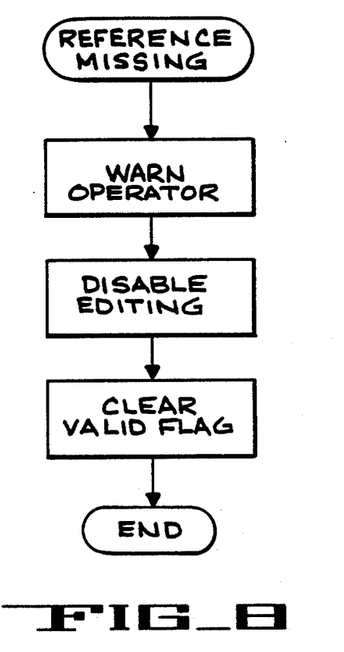

FIG. 8 depicts the routine when the reference signal on line 30 disappears. Since the disappearance of the reference indicates the loss of color sequence information by the controller 14, the operator is warned, and the editing operations are disabled. After the reference signal is restored, the flag must be cleared in order to enable the editing operations. Thus the reference must be synchronized again as previously described in FIG. 7.

By way of explaining how the missing reference is detected, the reference signal of line 30 continually triggers the retriggerable one-shot 32 within the control logic means 16 (FIG. 1). In addition, the control logic means 16 keeps track of when the reference signal (pulse) should occur such as, for example, by monitoring an internal clock which is synchronized to the reference. The internal clock may be a 3 millisecond interrupt pulse whereby, after a select number of interrupt pulses are detected, the reference pulse should occur. When the count in the frame counter means 22 is where it should be and the reference pulse is not received, the logic looks at the one-shot 32. If the latter has not been triggered, the reference is declared absent, and the operator is warned by suitable means such as a light or audible tone. In addition, all editing operations are disabled to prevent subsequent editing, and the valid flag that was set in the synchronize routine of FIG. 7 is cleared. Thus even though the reference may be recovered, the clearing of the valid flag will prevent editing until such time as the reference is again synchronized as via FIGS. 1 and 7.

In the event that the controller 14 is controlling a VTR 12 which has no time code signal, whose time code is not color framed, or fails to perform the color frame process, the manual embodiment of the invention may be used to determine the color sequence. In the manual embodiment, the function of the color frame computation means 18 is replaced by the operator when he performs a test edit utilizing the frame counter means 22 and the frame reference on line 30, whereby the operator may modify the processing in the frame counter means 22 to insure that the value supplied thereby is that required to synchronize the controller 14. More particularly, in response to the frame reference signal on line 30, the frame counter means 22 is continuously clocked for each frame. Thus in a NTSC system, the frame counter means 22 performs a divide-by-two function to continuously count 0, 1, 0, 1, etc., corresponding to the frames 1 and 2. In PAL, frame counter means 22 performs a divide-by-four function to count 0, 1, 2, 3, 0, etc. When performing an edit, since the color frame system in the VTR 12 is turned off, the edit always occurs in the right place on the recording tape. However, as previously mentioned the edit may, or may not be, color framed because the relationship between the frame counter means 22 value and the frame reference signal is not known. But now the operator has the means to determine whether the frame counter means 22 is properly synchronized to the color sequence. That is, the operator may make a test edit, or preview edit, and if the counter means output is not color framed a shift will occur in the picture at the time of the edit, which shift is visible to the operator. If a shift in the picture occurs, the frame counter means 22 manually is changed by one count via the manual input on bus 37 (FIG. 5). Thereafter, for all subsequent edits, the frame counter means 22 is properly synchronized.

In a PAL system, although the color framer in a VTR is turned off, the VTR will lock to the PAL four field sequence. Accordingly, since there is a four frame sequence involved, two possible counter shifts are provided in the PAL version of the manual embodiment of the invention. It follows that if the four field sequence is not being maintained, the VTR 12 will not lock up and the operator knows he should change the frame counter means 22 via the manual input on bus 37 to change the phase of the color frame number. He then makes the test edit of previous mention, and if the picture visually shifts, he then changes the frame counter means 22 to change the phase of the color frame number by two, and the counter is synchronized. If there is no picture shift visible during the edit test, the counter value is correct and no change need be made.

What is claimed is:

1. A system within a video tape recorder controller for determining the position in a color sequence of a selected frame in a color video reference signal, comprising:
frame counter means within the controller;
means for clocking the frame counter means once each frame in the color video reference signal;
means for supplying a time code number which is synchronized to the color video reference signal;
means coupled to the supplying means for determining a value corresponding to the position in the color sequence of the time code number;
means for processing the value in the frame counter means to provide a color frame sequence number which synchronizes the controller with the color video reference signal, including means for modifying the value processed in the frame counter means when the color frame sequence number fails to synchronize the controller; and
control logic means for selectively loading into the frame counter means said value corresponding to the position in the color sequence to synchronize the controller with the color video reference signal.

2. The system of claim 1 wherein:
said tape recorder supplies the time code number;
said means for determining includes time code separator means for providing a binary value indicative of the position in the color sequence of the time code number; and
said frame counter means includes a counter clocked by the clocking means for receiving the modified processed value in response to the control logic means.

3. The system of claim 1 wherein the clocking means comprises a video vertical-related sync signal source.

4. The system of claim 1 during an edit process further including:
means for supplying a time line;
means for computing a start value indicative of the start of the time line;
means for comparing the value in the frame counter means with the computed start value; and
means for supplying an edit start command when the frame counter means value matches the computed start value to perform the edit process.

5. A system for determining the position in a color sequence of a selected frame in a color video reference signal, comprising:
means for supplying a time code signal which is synchronized to the color video reference signal;
means coupled to the supplying means for determining a value corresponding to the position in the color sequence of the selected frame;
control logic means for generating a counter load control signal; and
counter means coupled to the determining means for receiving said value corresponding to the position in the color sequence in response to the counter load control signal.

6. The system of claim 5 wherein the control logic means includes:
means for detecting the absence of the color reference signal; and
means for supplying a signal indicative of the absence.

7. The system of claim 5 wherein the determining means includes:
means for deriving from the time code signal a time code number corresponding to the selected frame; and
means for performing a modulus 2 operation on the time code number to provide said value.

8. The system of claim 5 wherein the determining means includes:
means for deriving from the time code signal respective numbers corresponding to the selected frame and the time in seconds;
means for summing the numbers corresponding to the selected frame and the time in seconds; and
means for performing a modulus 4 operation on the summation to provide said value.

9. The system of claim 5 wherein the counter means includes;
means for supplying a clock once each frame in the color video reference signal;
a counter for providing a color count in response to said clocking means; and
means for performing a selected modulus operation on the color count.

10. The system of claim 5 further including a video tape recorder having the supplying means, and a time line, wherein said determining means includes:
means for computing a value indicative of the start of the time line in the video tape recorder;
means for comparing said value in the counter means with the computed value indicative of the start of the time line; and
means for supplying an edit start command when said value in the counter means matches the computed value.

11. The system of claim 10 wherein the computing means includes:
means for supplying numbers corresponding to a preroll value and an edit entry point value;
means for summing the supplied numbers together; and
means for performing a selected modulus operation on the summation to provide the value indicative of the time line start.

12. A method for determining the position in a color sequence of a selected frame in a color video reference signal, comprising:
placing a video tape recorder into color frame play mode for a preselected period of time to synchronize the recorder to the color video reference signal;
supplying a time code signal from the recorder;
determining from the time code signal the position in the color sequence of the selected frame in the color video reference signal; and
loading a value corresponding to the selected position into counter means to synchronize the counter means to the color video reference signal at that instant in time.

13. The method of claim 12 wherein the step of determining includes:
computing the position of a selected time code frame in the color sequence corresponding to the position in the color sequence of the corresponding frame in the reference signal.

14. The method of claim 13 wherein the step of loading includes:
generating a counter load control signal; and forcing the counter means to the value of the selected position in the color sequence in response to the counter load control signal.

15. The method of claim 13 in a NTSC television standard system, wherein the step of computing includes:
deriving a frame number from the time code signal; and
operating on the frame number with a modulus 2 operator to provide the selected position in the color sequence.

16. The method of claim 13 in a PAL television standard system, wherein the step of computing includes:
deriving a frame number and a seconds number from the time code signal;
adding the frame number and the seconds number together to provide a frames-plus-seconds value; and
operating on the frames-plus-seconds value with a modulus 4 operator to provide the selected position in the color sequence.

17. The method of claim 12 including:
monitoring the reference signal to detect when the counter means is no longer synchronized to the reference signal; and
providing a signal indicative of the lack of synchronization.

18. The method of claim 12 during an edit process employing a time line, including:
computing a start value indicative of the start of the time line;
comparing the value in the counter means with the computed start value; and
supplying an edit start command when the counter means value and the computed start value are equal.

19. The method of claim 18 wherein the step of computing includes:
supplying numbers corresponding to fixed preroll and edit entry point values;
summing the two numbers together with a selected constant; and
operating on the results of the previous step with a selected modulus operator to provide the computed start value indicative of the time line start.

20. A method for determining the position in a color sequence of a selected frame in a color video reference signal, comprising:

supplying a time code signal which is synchronized to the color video reference signal; selecting a time code number corresponding to said selected frame;
determining a color sequence number corresponding to the time code number; and
loading the color sequence number in a counter to synchronize the counter to the color video reference signal at that instant in time.

21. A system for controlling a video tape recorder via a controller during an edit process utilizing a time line, wherein the system determines the position in a color sequence of a selected frame in a color video reference signal, comprising:
frame counter means within the controller;
means coupled to the frame counter means for clocking the latter once every frame in the color video reference signal;
means for supplying a time code signal which is synchronized to the color video reference signal;
means receiving said time code signal for calculating a value corresponding to the position in the color sequence of the selected frame;
control logic means coupled to the video tape recorder and to the frame counter means for loading the calculated value in the frame counter means; and
said control logic means including means for computing a start value indicative of the start of the time line and for starting the edit process when the value in the frame counter means matches the computed start value.

22. The system of claim 21 wherein the frame counter means includes:
a frame counter for storing a color count value in response to said clocking means;
means for shifting the color count value by a preselected count; and
means coupled to the shifting means for performing a selected modulus operation on the color count value.

23. The system of claim 21 wherein the control logic means further includes:
means for comparing the value in the frame counter means with the computed start value; and
wherein the means for comparing supplies an edit start command when the value in the frame counter means matches the computed start value to initiate the edit process.

* * * * *